Sept. 1, 1931.  E. C. NEWTON  1,821,356
PISTON RING SQUEEZER
Original Filed Aug. 10, 1927
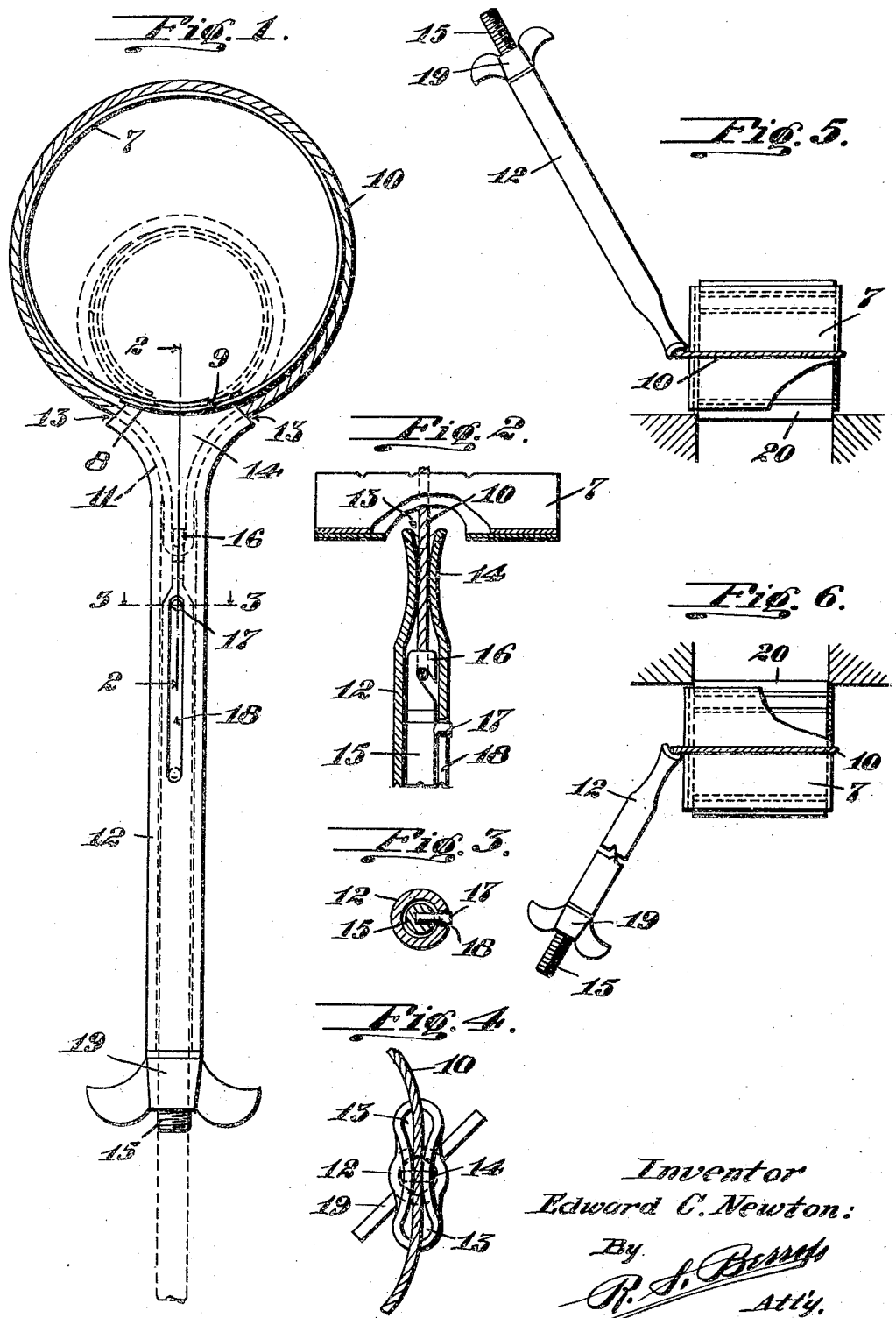
Inventor
Edward C. Newton:
By
R. S. Berry
Atty.

Patented Sept. 1, 1931

1,821,356

UNITED STATES PATENT OFFICE

EDWARD C. NEWTON, OF LOS ANGELES, CALIFORNIA, ASSIGNOR TO E. C. NEWTON CORPORATION, OF LOS ANGELES, CALIFORNIA, A CORPORATION OF CALIFORNIA

PISTON RING SQUEEZER

Application filed August 10, 1927, Serial No. 211,868. Renewed February 18, 1931.

This invention relates to a manually operable tool for contracting piston rings preparatory to the act of inserting into its cylinder a piston upon which the piston rings are mounted.

An object of the invention is to provide an exceedingly simple tool of this character which will engage and simultaneously contract all the rings mounted on a piston so that the latter can, without difficulty be inserted into its cylinder.

A further object is to so construct the device that it can advantageously be used to contract the rings upon a piston and then insert the piston into its cylinder with equal facility whether it is necessary to move the piston upwardly, downwardly or in some direction at the moment of its insertion into the cylinder.

Referring to the accompanying drawings, which illustrate a preferred embodiment of the invention:

Fig. 1 is a plan view of the tool illustrating in full lines the ring engaging portion in expanded position and depicting in dotted lines the ring engaging portion in a contracted position;

Fig. 2 is a detail in longitudinal section and elevation as seen on the line 2—2 of Fig. 1;

Fig. 3 is an enlarged cross section on line 3—3 of Fig. 1;

Fig. 4 is an end view of the traction means, a portion of the flexible connection being broken away to contract the view;

Fig. 5 is a view illustrating the tool being used to contract the rings of a piston and positioned for insertion into a piston cylinder which opens downwardly;

Fig. 6 is a view illustrating the tool as positioned for insertion of the piston and its rings into a piston cylinder which opens upwardly.

Referring in detail to the drawings, 7 designates a resilient sleeve of spiral form having overlapping disconnected ends; 8 indicating its outer end and 9 its inner end. A flexible band 10 embraces said sleeve circumferentially, a portion 11 of said band extending into a tubular shank 12 through openings 13 with which one end of said shank is provided, which end of the shank is flattened at 14 as shown. Within said shank 12 is a screw threaded rod 15 having a hook 16 at one end with which the portion 11 of the band 10 is engaged in order that by retraction of said rod, the band 10 may be tightened upon the sleeve 7 to contract the latter.

The rod 15 is provided with a pin 17 which extends into and slidably engages a longitudinal slot 18 with which the tubular shank 12 is provided, whereby the rod and shank are held against relative rotation. The rod 13 projects at all times from the outer end of said shank and its projecting portion has a screw threaded engagement with a turnable manually operable actuating nut 19, which is adapted to abut against the outer end of the shank.

In the operation of the invention the sleeve 7 is positioned around a piston 20 to encompass the piston rings on the latter, whereupon the nut 19 is manipulated to effect retraction of the rod 13; rotation of the nut 19 in one direction causing the latter to advance on the threaded portion of the rod 13 with the nut bearing against the outer end of the shank 12. This retraction of the rod 13 exerts a pull on the band 10 causing the latter to contract the sleeve 7. In this manner the sleeve may be caused to engage the piston rings on the piston and operate to contract the rings so that the outer peripheries of the latter will extend flush with the circumferential surface of the piston when the sleeve 7 is contracted substantially to contact the cylindrical surface of the piston. In thus positioning the sleeve 7 on the piston, the end portion of the latter is exposed to admit of its readily being inserted in the engine cylinder. On inserting the exposed end portion of the piston being inserted within the cylinder with the end of the sleeve abutting against the end of the cylinder the piston is driven, as by a mallet, into the cylinder together with its rings; the piston sliding through the sleeve during this operation. The piston rings being contracted by the sleeve 7 will thus be fed into the cylinder with the piston.

After the piston has been advanced into the cylinder such distance as to dispose the rings within the cylinder the nut 19 is retracted on the stem 13 so as to allow the sleeve 7 to expand whereupon the latter may be freely withdrawn from the piston.

The sleeve 7 is formed of thin resilient metal such as spring steel and is normally of such diameter as to be adapted to be applied to large sized pistons, but by reason of its flexibility is adapted to be contracted to such extent as to be adapted to be applied to pistons of comparatively small size, as indicated by way of comparison in Fig. 1. This gives the tool a wide range of use.

The end portion 14 of the shank 12 is flared as are the walls of the openings 13 so that the portions of the band passing therethrough may be readily flexed and so as to obviate kinking of the band. The band being flexible permits the shank being swung to extend at an angle either upwardly or downwardly relatively to the sleeve so as to facilitate disposing the piston engaged by the sleeve in position to enter the upper end of a cylinder as shown in Fig. 5 or be inserted in the lower end of the cylinder as shown in Fig. 6.

It is understood that the invention is not limited to the specific embodiment thereof illustrated in the drawings, but that changes of construction may be made by those skilled in the art without necessarily departing from the spirit of the invention as defined by the claims.

I claim:

1. In a device of the character described, a contractable sleeve, a flexible band to embrace said sleeve, a member having an opening through which said band is led, and means to draw a portion of said band through said opening to contract said sleeve.

2. In a device of the character described, a contractable sleeve, a flexible band extending therearound, a member having an opening through which said band is led, a part to which said band is fastened, said part being movable with relation to said member to a retracted position to tighten said band upon said sleeve, and means to retain said part in a retracted position.

3. In a device of the character described, a contractable sleeve, a flexible band extending therearound, a member having an opening through which said band is led, a part to which said band is fastened, said part being provided with screw threads, and a rotatable element having screw threads engaging the screw threads of said part to move said part with relation to said member and thereby tighten said band upon said sleeve.

4. In a device of the character described, a resilient sleeve having disconnected ends, a flexible band, and means comprising a hook operable at any angle to said band and adapted to be hooked to the band so as to tighten said band upon said sleeve to contract the latter and to relax said connection to permit said sleeve to expand itself.

5. In a device of the character described, a resilient sleeve having disconnected ends, a flexible band embracing said sleeve, a tubular member into which a portion of said band extends, a non-rotatable part within said member, said band being fastened to said part, and a rotatable element having a screw threaded engagement with said part to retract the latter in order to tighten said band upon said sleeve.

In testimony whereof, I have affixed my signature.

EDWARD C. NEWTON.